United States Patent [19]

Colegrove et al.

[11] Patent Number: 4,696,677
[45] Date of Patent: Sep. 29, 1987

[54] QUATERNARY AMMONIUM SALTS OF ANIONIC GUMS

[75] Inventors: George T. Colegrove; Kenneth Clare, both of San Diego, Calif.

[73] Assignee: Merck & Co., Inc., Rahway, N.J.

[21] Appl. No.: 850,467

[22] Filed: Apr. 11, 1986

[51] Int. Cl.[4] .................................................. C10L 1/32
[52] U.S. Cl. ...................................... 44/51; 536/18.6; 536/55.1
[58] Field of Search .................... 44/51; 536/18.6, 55.1

[56] References Cited

U.S. PATENT DOCUMENTS

| Re. 23,528 | 7/1952 | Gaver et al. | 536/55.1 |
|---|---|---|---|
| 3,163,602 | 12/1964 | Lindblom et al. | 252/8.55 |
| 3,928,316 | 12/1975 | Jordan | 260/209 R |
| 4,018,729 | 4/1977 | Faucher et al. | 132/7 |
| 4,201,552 | 5/1980 | Rowell et al. | 44/51 |
| 4,242,098 | 12/1980 | Braun et al. | 44/51 |

FOREIGN PATENT DOCUMENTS

| 0079794 | 5/1983 | European Pat. Off. | 44/51 |
|---|---|---|---|
| 53-45307 | 4/1978 | Japan | 44/51 |
| 53-123407 | 10/1978 | Japan | 44/51 |
| 54-124008 | 9/1979 | Japan | 44/51 |
| 54-129007 | 10/1979 | Japan | 44/51 |
| 55-48291 | 5/1980 | Japan | 44/51 |
| 0047493 | 4/1981 | Japan | 44/51 |
| 0944738 | 12/1963 | United Kingdom | 44/51 |

*Primary Examiner*—William R. Dixon, Jr.
*Assistant Examiner*—Margaret B. Medley
*Attorney, Agent, or Firm*—Gabriel Lopez; Hesna J. Pfeiffer

[57] ABSTRACT

Partially derivatized anionic gums are disclosed. The gum derivatives are prepared by reacting non-derivatized gum with quaternary ammonium compounds in less than the stoichiometric amount required for complete derivatization. The partially derived gums are water soluble and resistant to bacterial degradation.

7 Claims, No Drawings

QUATERNARY AMMONIUM SALTS OF ANIONIC GUMS

BACKGROUND OF THE INVENTION

U.S. Pat. No. 3,163,602 teaches fully derivative xanthan gum prepared by reacting xanthan gum aqueous solutions (either fermentation broth or solutions from dry powder) with an excess amount of quaternary ammonium compounds. The derivative gum is insoluble in distilled water but soluble in brine.

SUMMARY OF THE INVENTION

Partially derivatized anionic gums have now been found which are produced by reaction an anionic gum with less than the stoichiometric amount of a quaternary ammonium compound necessary for complete derivatization of the gum. The partially derivatized gums are soluble in distilled or tap water and, thus, find much greater applicability than, for example, the brine-soluble fully derivatized gum of U.S. Pat. No. 3,163,602. Surprisingly, the gums are also resistant to bacterial degradation and can be used in aqueous solution without a preservative.

The anionic gums useful for preparing the partially derivatized quaternary ammonium salts of this invention include the following: xanthan, algin, carrageenan (iota-, kappa-, and lambda-), arabic, ghatti, karaya, tragacanth, pectin, alkoxy celluloses such as carboxymethyl cellulose and carboxymethylhydroxyethyl cellulose, carboxymethyl guar, and carboxymethyl locust bean gum. It is understood that some of these gums (e.g., carboxymethyl cellulose) are already derivatized; however, as used herein, they will be considered non-derivatized.

All of these gums are known and commercially available.

By "algin" as used herein is meant alginic acid and the salts thereof, such as the sodium, ammonium, propylene glycol, etc. alginates.

By the term "xanthan gum", as used herein, is meant the extracellularly produced gum made by the heteropolysaccharide-producing bacterium *Xanthomonas campestris* by the whole culture fermentation under a variety of conditions of a medium comprising: a fermentable carbohydrate, a nitrogen source, and other appropriate nutrients. Examples, *inter alia*, of commercially available xanthan gums are KELTROL ® and KELZAN ®, available for Kelco Division of Merck & Co., Inc.

Processes for producing xanthan gum are well-known in the art, e.g., U.S. Pat. Nos. 4,316,012; 4,352,882; 4,375,512; 3,671,398; 3,433,708; 3,271,267; 3,594,280; 3,591,578; 3,391,061; 3,020,206; 3,481,889; 3,391,060; and UK No. 1,448,645.

The quaternary ammonium compounds (quats) useful in this invention are those having a single alkyl or alkenyl substituent containing from about 13 to 24 carbon atoms, or two alkyl or alkenyl substituents of 12 to 24 carbons per substituent and the ethylene oxide substituted analogs thereof. These are known compounds. An especially useful quat is alkyl dimethylbenzylammonium chloride.

The partially derivatized anionic gum salts of this invention comprise about 3–20% quat by weight of anionic gum; preferably 5–10% quat.

These salts are readily formed by intimately mixing the non-derivatized anionic gums and the quats, preferably in an aqueous solution, slurry, or suspension. Generally, this is done under mild conditions such as room temperature and neutral pH. However, temperatures can range from about 10° to 90° C. and pH 2–8. High agitation of the reaction mixture is preferred to avoid locally high quat concentrations and consequent formation of fully derivatized gum salts. Although tap water may be used it is preferable that there be no added soluble salts as such salts tend to screen anionic functional groups and thus tend to prevent the gum/quat reaction.

Xanthan gum is a preferred anionic gum. The xanthan gum salts of this invention are useful in oil well applications, as decribed in U.S. Pat. No. 3,163, 602. Advantageously, they do not require brine for dissolution and therefore are useful in a broader range of geographic areas, as where fresh rather than brackish local water is readily available for drilling fluid or injection fluid preparation. However, the use of these partially derivatized gums is not limited to oil field applications. Generally, they may be used wherever xanthan gum is useful, especially in industrial applications.

The partially derivatized anionic gums of this invention, especially those of xanthan gum, are useful in water-based coal slurries. These slurries are suspensions of finely crushed coal in water which are used as subtitutes for fuel oils. The slurries comprise up to about 78% coal (U.S. Pat. No. 4,242,098), and optionally up to 20% petroleum fuel such as No. 6 oil (Development and Evaluation of Highly-Loaded Coal Slurries, Scheffee, R. S., pp. 222–232, Proceedings of the First International Symposium or Coal-Oil Mixture Combustion, May 7–9, 1978, St. Petersburg Beach, Fla.), the balance being water and a stabilizing agent. (These references are incorporated herein by reference.) Because of the natrually occurring presence of depolymerase-producing microorganisms in coal, slurries stabilized with polymers such as cellulose, xanthan gum, etc. require the use of a preservative. Scheffee suggests the use of 0.1% formaldehyde. However, because of the adsorption of these perservatives on the surface of the coal particles, depolymerization of the stabilizing gums continues to be problematical. Advantageously, the partially derviatized anionic gums of this invention are self-preserving and requires no additional preservative in suspensions such as aqueous coal slurries.

The invention therefore also encompasses coal slurries comprising on a wt./wt. basis 50–78% coal, 0–20% petroleum fuel, 0.01 to 0.1% partiallly derivatized anionic gum, and water to 100%. Preferably, the gum level is 0.05 to 0.1% and the coal is 65–70%. The coal slurries also optionally contain about 1–2% dispersant, preferably an anionic dispersant.

Generally, the partially derivatized anionic gums of this invention are useful in all non-food applications in which the non-derivatized gums are useful. Especially useful are those applications wherein a preservative would normally be used, such as coal slurries, described supra, or other formulations requiring long term storage of where bacterial degration of the gum is likely to occur.

The invention is further defined by reference to the following examples, which are intended to be illustrative and not limiting.

Temperatures are in degress Celsius

DEPOLYMERIZATION TEST PROTOCOL

Eight xanthan gum polymerase-producing organisms from the genera Arthrobacter, Bacillus, and Coryneform were grown on nutrient agar and swirled together in a sterilized flask to be used for depolymerizing gum samples.

Tests were conducted in 250 ml sterile Erlenmeyer flasks. The test solutions consisted of 50 ml coal slurry (containing 0.05–0.01% xanthan gum), or xanthan gum (at 0.5% concentration) without coal. The inoculum, 2.5 ml of the xanthan degrading organisms, was added. The flasks were swirled to achieve adequate mixing and incubated at 30° C. without agitation. After 72 hours, the solutions were removed and the viscosities were tested at 3 and 60 r.p.m. on a Brookfield LVT Viscometer using the No. 2 spindle.

EXAMPLE 1
DERIVATIVES FROM DRY GUM

Myristyldimethyl benzyl ammonium chloride, 100% active (Barquat MS-100) in various amounts was dissolved in 25 g de-ionized (DI) water, 10 g xanthan gum (KELZAN) was dissolved in 500 g DI water. The quat solution was added to the xanthan gum solution under high agitation. After mixing for one hour the solution was precipitated with 1000 ml of isopropanol (IPA), dried, and milled. The partially derivatized gum was depolymerized per the Test Protocol and the data of Table 1-1 were obtained.

TABLE 1-1

|  | Viscosity (cP) at 3 RPM | |
|---|---|---|
|  | Initial | After 72 Hours |
| (a) Xanthan gum control | 4800 | <10 |
| (b) 1% quat by wt. | 5400 | <50 |
| (c) 3% quat by wt. | 4700 | 4300 |
| (d) 5% quat by wt. | 5000 | 4500 |
| (e) 7.5% quat by wt. | 4900 | 4650 |
| (f) 10% quat by wt. | 4400 | 4300 |

The lowest effective concentration of quat was 3% weight of xanthan gum.

EXAMPLE 2
DERIVATIVES FROM XANTHAN GUM BEER

Various amounts of a 25% solution of Barquat MS-100 were added slowly to 500 g unpasteurized xanthan gum fermentation beer under high agitation and then treated as in Example 1. In an alternate process, the same amounts of quat were added to IPA. The IPA with added quat was then reacted with beer under high agitation to produce partially derivatized gum and to precipitate the gum, which was then dried and milled and depolymerized as in Example 1. The data of Table 2-1 were obtained.

TABLE 2-1

|  | Viscosity (cP) at 3 RPM | |
|---|---|---|
|  | Initial | After 72 Hours |
| (a) 3% Quat in beer | 2350 | 1900 |
| (b) 3% Quat in IPA | 2300 | 1850 |
| (c) 5% Quat in beer | 2300 | 2000 |
| (d) 5% Quat in IPA | 1900 | 1900 |
| (e) 7.5% Quat in beer | 2300 | 1950 |
| (f) 7.5% Quat in IPA | 2400 | 1900 |

EXAMPLE 3
COAL SLURRIES

Coal slurries (1000 g) were prepared with xanthan gum (KELZAN) and 3%, 5% and 7.5% xanthan/quat derivatives as stabilizers using the following formulation:

| Coal Formulation | Wt. % |
|---|---|
| Coal | 68.0 |
| Anionic surfactant (Lomar A-23) | 1.67 |
| Morpholine* | 1.0 |
| Xanthan gum (or quat derivative) | 0.06 (0.063) |
| Water | to 100 |

*Buffer to raise pH to 10.0.

These were tested according to the Test Protocol and the data of Table 3-1 were obtained. In (a-e), the dispersant Lomar A-23 was used; in (f), Tetronic 1107 was used.

TABLE 3-1

|  |  | Visco (cP) at 3 RPM | |
|---|---|---|---|
| Stabilizer | Concen. ppm | Initial | After 72 Hours |
| (a) Kelzan, no coal | 600 | 600 | 50 |
| (b) Kelzan, coal slurry | 600 | 1000 | 540 |
| (c) 3% Quat | 630 | 1000 | 600 |
| (d) 5% Quat | 630 | 750 | 710 |
| (e) 7.5% Quat | 630 | 1200 | 1210 |
| (f) 7.5% Quat | 630 | 800 | 300 |

EXAMPLE 4

A variety of quaternary ammonium salts were prepared by dissolving 1.0 g of active quat in 25 ml DI water, heating to 60° C. if necessary to dissolve the quat, and slowly adding the quat with high agitation to 500 g of a 4% gum fermentate. The fermentate with added quat was stirred for one hour and then precipitated with 1000 ml IPA, dried, and milled.

Following the procedure of the Test Protocol, the data of Table 4-1 were obtained.

TABLE 4-1

|  | Viscosity (cP) at 3 RPM | |
|---|---|---|
|  | Initial | After 72 Hours |
| (a) Control (no quat) | 4350 | <50 |
| (b) 5% Ethoquad 18/12 | 5100 | 4600 |
| (c) 5% Arquad 2C-75 | 4700 | 4750 |
| (d) 5% Arquad 12-50 | 5550 | <50 |
| (e) 5% Arquad 18-50 | 4100 | 4700 |
| (f) 5% Ethoquad 18/25 | 5200 | 4400 |
| (g) 5% Jordaquat 1033 | 5450 | 5100 |

Arguad 12-50 contains a single side chain of 12 carbons. Based on these data, xanthan gum quaternary salts prepared from a quat containing a single side chain of less than 13 carbons are not effective.

Chemically, the quats of Table 4-1 are as follows:

Ethoquad 18/12—octadecyltrimethyl ammonium chloride containing 2 moles ethylene oxide, 70–75% active;

Arquad 2C—75—dicocodimethyl ammonium chloride, 75% active;

Arquad 12-50—dicocodimethyl ammonium chloride, 50% active;

Arquad 18-50—octadecyltrimethyl ammonium chloride, 50% active;

Ethoquad 18/25—octadecyltrimethyl ammonium chloride containing 15 moles ethylene oxide, 95% active; and Jordaquat 1033—soyadimethylethyl ammonium ethosulfate, 54% active

What is claimed is:

1. A partially derivatized quaternary ammonium salt of an anionic gum comprising 3-20% quaternary ammonium compound by weight anionic gum, wherein said quaternary ammonium compound contains a single alkyl or alkenyl substituent of 13-24 carbon atoms or two alkyl or alkenyl substituents of 12-24 carbon atoms per substituent, and the ethylene oxide substituted analogs thereof.

2. A salt of claim 1 wherein the anionic gum is xanthan gum, alginic acid, sodium alginate, ammonium alginate, propyleneglycol alginate, iota-. kappa-, or lambda-carrageenan, gum ghatti, karaya gum, tragacanth gum, gum arabic, pectin, alkoxycelluloses, carboxymethyl guar or carboxymethyl locust bean gum.

3. A salt of claim 1 comprising 5-10% quaternary ammonium compound.

4. A salt of claim 1 comprising xanthan gum and 3-10% quaternary amonium compound.

5. A process for preparing partially derivatized quaternary ammonium salts of anionic gum which comprises intimately mixing a non-derivatized anionic gum with 3-20% by weight of a quaternary ammonium chloride compound.

6. A process of claim 5 wherein the mixing is at 10°-90° C. under high agitation.

7. An aqueous coal slurry comprising by weight 50-78% coal, 0-20% petroleum fuel, 0.01 to 0.1% partially derivatized quaternary ammonium salt of claim 1, 0-2% dispersant, and water to 100%.

* * * * *